March 29, 1938. F. A. MARTOCCIO 2,112,443
CANDY CUTTING MACHINE
Filed Nov. 25, 1933 6 Sheets-Sheet 1

Fig. 1

Inventor
Frank A. Martoccio
By Caswell & Lagaard
Attorneys

March 29, 1938.  F. A. MARTOCCIO  2,112,443
CANDY CUTTING MACHINE
Filed Nov. 25, 1933  6 Sheets-Sheet 2

Fig. 2

Inventor
Frank A. Martoccio
By Caswell + Lagaard
Attorneys

Fig. 4

Patented Mar. 29, 1938

2,112,443

UNITED STATES PATENT OFFICE 2,112,443

CANDY CUTTING MACHINE

Frank A. Martoccio, Minneapolis, Minn.

Application November 25, 1933, Serial No. 699,740

7 Claims. (Cl. 107—21)

My invention relates to candy cutting machines and particularly to the type of machine in which the candy is formed in strips and progressed to the cutter where the strips are cut off in sections forming candy bars.

An object of the invention resides in providing a cutting machine of such nature in which the cutter travels with the candy bar as the cutting takes place.

Another object of the invention resides in constructing the machine with a conveyor for progressing the strips of candy to the cutter and in providing a carriage movable in the same direction as the conveyor and supporting the cutter of the invention.

A still further object of the invention resides in constructing the cutter with a head having stems depending therefrom and in further providing cutting blades attached to said stems and adapted to cut the candy as the same is progressed.

A feature of the invention resides in constructing the carriage with a bed in which the stems of the cutter are guided for reciprocating movement.

An object of the invention resides in moving the carriage during the cutting operation at an average rate of speed greater than the rate of speed of the feed conveyor to prevent compressing of the strip of candy during the cutting operation.

A still further object of the invention resides in employing both a feed conveyor and a delivery conveyor between which the cutter is situated and in utilizing the bed on the cutter for transferring the candy from the feed conveyor to the delivery conveyor.

A feature of the invention resides in operating the delivery conveyor at a higher rate of speed than the feed conveyor to procure spacing of the candy bars upon the delivery conveyor.

An object of the invention resides in constructing the machine with a framework and in supporting the driving means for reciprocating said carriage and also for reciprocating the cutter on the framework.

A feature of the invention resides in utilizing two cranks and connecting rods connected thereto for the purpose of operating the carriage and cutter.

Another object of the invention resides in arranging the axis of the crank shaft for operating the cutter at a locality intermediate the end positions of the pin of the connecting rod, and below the same.

An object of the invention resides in providing means for heating and moistening the blades of the cutter.

A still further object of the invention resides in providing a steam jet for moistening and heating the blades.

Another object of the invention resides in providing a conduit through which steam passes and in providing said conduit with steam jets from which the steam is directed to the cutting blades and in further employing troughs running beneath said conduit for collecting the condensation from the steam jets.

A feature of the invention resides in employing a super-heater for superheating the steam and in mounting said super-heater upon the carriage.

Another object of the invention resides in the specific construction of the cutter.

Other objects of the invention reside in the novel combination and arrangement of parts and in the details of construction hereinafter illustrated and/or described.

In the forming of candy bars it has heretofore been found exceedingly difficult to construct a candy bar of any desired size with accurate cubical dimensions. The present invention provides a machine in which the stock candy is fed to the machine in rectangular strips and from which sections of the bar are accurately cut off through a series of cutting blades by means of which sections are formed having square corners.

Figure 3:
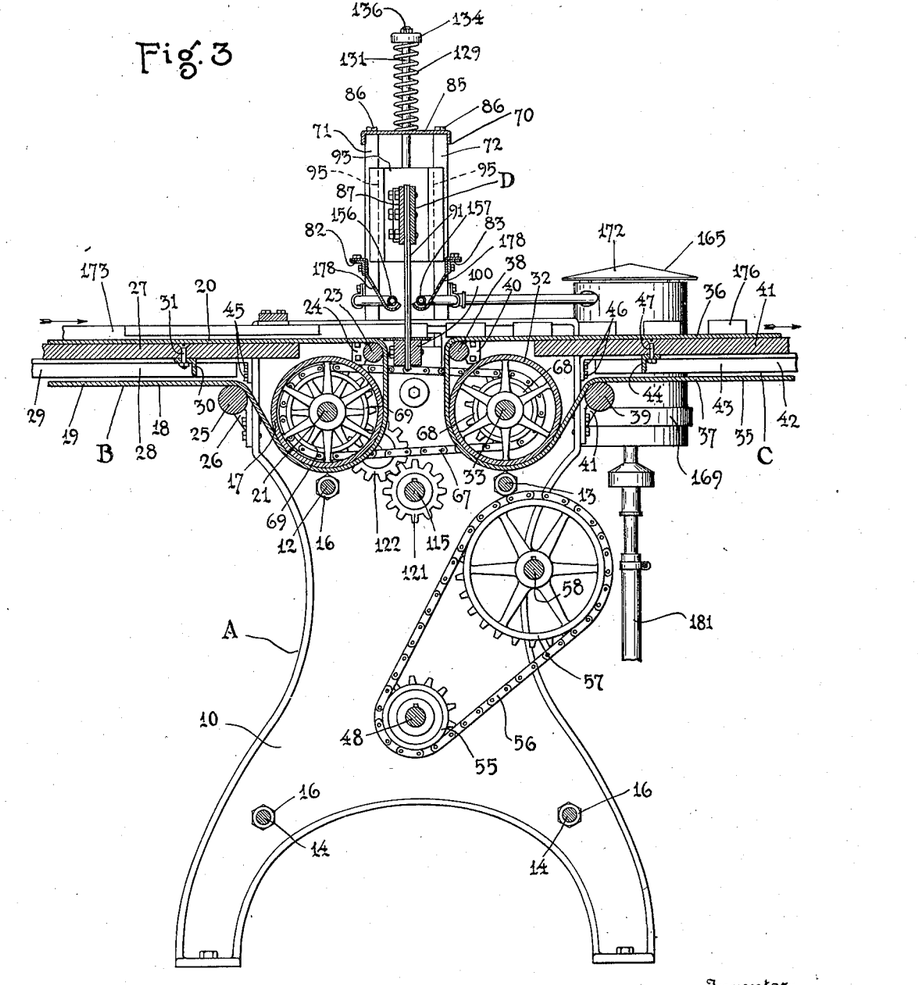
Fig. 3 is a longitudinal sectional view taken on line 3—3 of Fig. 2.

My invention comprises a framework indicated in its entirety at A which supports the major part of the invention. The invention proper consists of a feed conveyor B, a delivery conveyor C, both traveling in the same direction and arranged end to end in spaced relation as best shown in Fig. 3. Between these two conveyors is operable a cutter D by means of which strips of candy 173 fed to the machine through the conveyor B are cut off in sections 176, the said sections being carried away from the machine through the delivery mechanism C. These various parts will now be described in detail.

The framework A consists of two end frame members 10 and 11 which are secured together and held in spaced relation through a number of transversely extending rods 12, 13 and 14. These rods are threaded at their ends and are provided at each end with two nuts 15 and 16. Nuts 15 are situated upon the exterior of the end frame members 10 and 11 while the nuts 16 are situated upon the interior of said frame members. By means of this construction the two end frames are rigidly held secured together and in proper spaced relation.

The conveyor B runs from a machine by means of which sheets of candy of the desired thickness are cut up into the narrow strips 173 for use in forming the candy bars 176. Inasmuch as said conveyor is of ordinary construction the receiving end of the same has not been shown though it can readily be comprehended that any suitable construction may be used for this purpose. The delivery end of the said conveyor comprises a roll 17 over which a belt 18 travels. The lower run of the belt 18 is indicated by the reference numeral 19 while the upper run of the said belt is indicated by the reference numeral 20. The roll 17 is mounted upon a shaft 21 which is journaled in bearings 22 formed in the end frame members 10 and 11. The upper run 20 of the belt 18 passes over an idler roll 23 which is of small diameter as compared to the roll 17. This idler roller prevents forming a large gap between the two conveyors B, C, whereby the severed sections of the candy may be easily transferred from one conveyor to the other. The roll 23 is constructed at its ends with trunnions not shown, which are journaled in bearings 24 secured to the end frame members 10 and 11. In addition to the idler roll 23 another idler roll 25 is employed which engages the under surface of the run 19 of the belt. This roll is similar to the roll 23 and is constructed with trunnions which are journaled in bearings 26 secured to the end frame members 10 and 11. The roll 25 is for the purpose of causing the belt to have sufficient wrap about the roll 17 so that sufficient traction may be procured to drive the conveyor by means of said roll.

The upper run 20 of the belt 18 travels over a table 27, the upper surface of which is on the same elevation as the upper tangential element of the roll 23. This table is mounted on a frame 28 consisting of longitudinal angle frame members 29 and transverse angle frame members 30 secured together in any suitable manner. The frame 28 is attached to the end frame members 10 and 11 through bolts 45 best shown in Fig. 3. Table 27 may be bolted to the frame 28 through bolts 31.

The conveyor C is constructed in much the same manner as the conveyor B. A roll 32 the same size as the roll 17 is mounted on a shaft 33 which is journaled in bearings 34 formed in the end frame members 10 and 11. A belt 35 passes over the roll 32, the upper run of said belt being indicated by the reference numeral 36 and the lower run of said belt being indicated by the reference numeral 37. The run 36 of belt 35 passes over an idler roll 38 which is similar to the roll 23 and serves the same purpose. In like manner another idler roll 39 engages the underside of the run 37 of belt 35 and serves the same purpose as the roll 25 to procure suitable traction between the roll 32 and the said belt. Roll 38 is constructed with trunnions journaled in bearings 40, the same as the bearings 24, which bearings are secured to the frame members 10 and 11. Roll 39 is similarly constructed with trunnions which are journaled in bearings 41 which, similar to the bearings 26, are secured to the end frame members 10 and 11.

In conjunction with the conveyor C a table 41 is employed which is mounted on a frame 42 similar to the frame 28. Frame 42 consists of longitudinal angle frame members 43 and transverse angle frame members 44. The frame member 43 is bolted to the end frame members 10 and 11 of the framework A by means of bolts 46. The table 41 is bolted to the frame through bolts 47, similar to the bolts 31.

For driving the conveyors B and C and for operating the other mechanism of the invention, a drive shaft 48 is employed which extends transversely of the machine and which is journaled in bearings 49 and 50 formed in the frame members 10 and 11. The shaft 48 is held from longitudinal movement with respect to said bearings through two collars 51 and 52 which are secured to said shaft through set screws 53. Upon the shaft 48 is mounted a pulley 54 by means of which the shaft 48 may be driven from a motor or other suitable source of power not shown. Mounted on the shaft 48 is a sprocket wheel 55. A chain 56 passes over this sprocket wheel and another sprocket wheel 57 fast on a countershaft 58 extending across the machine proper. Shaft 58 is journaled in bearings 59 and 60 formed in the frame members 10 and 11, the same as the bearings 49 and 50. Shaft 58, similar to the shaft 48, is held from longitudinal movement in said bearings through collars 61 and 62 which are secured to said shaft through set screws 63. The shaft 58 carries another sprocket wheel 64 which is situated toward one end of the machine. A chain 65 passes over this sprocket wheel and another sprocket wheel 66 mounted on the shaft 33. By means of this construction the roll 32 is driven and the belt 35 caused to travel in the direction indicated by the arrow in Fig. 3.

The conveyor B is driven from the conveyor C through a chain 67. This chain passes over a sprocket wheel 68 fast on shaft 33 and another sprocket wheel 69 fast on shaft 21. The sprocket wheel 68 is slightly smaller than the sprocket wheel 69 so that the runs of the belt 35 of conveyor C travel at a greater lineal speed than the runs of the belt 18 of conveyor B. By means of this difference in speed, spacing of the severed sections 176 of candy when reaching the conveyor C is procured.

Figure 1:
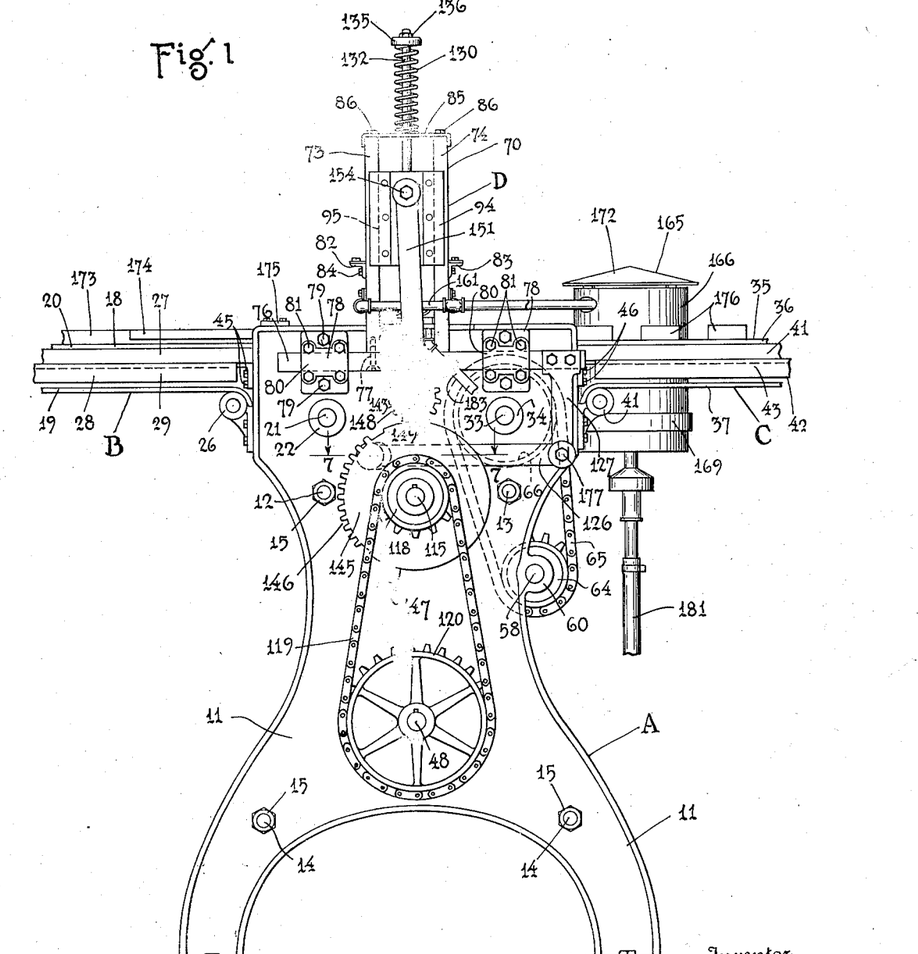
Fig. 1 is a side elevational view of a candy cutting machine illustrating an embodiment of my invention.
Figure 2:
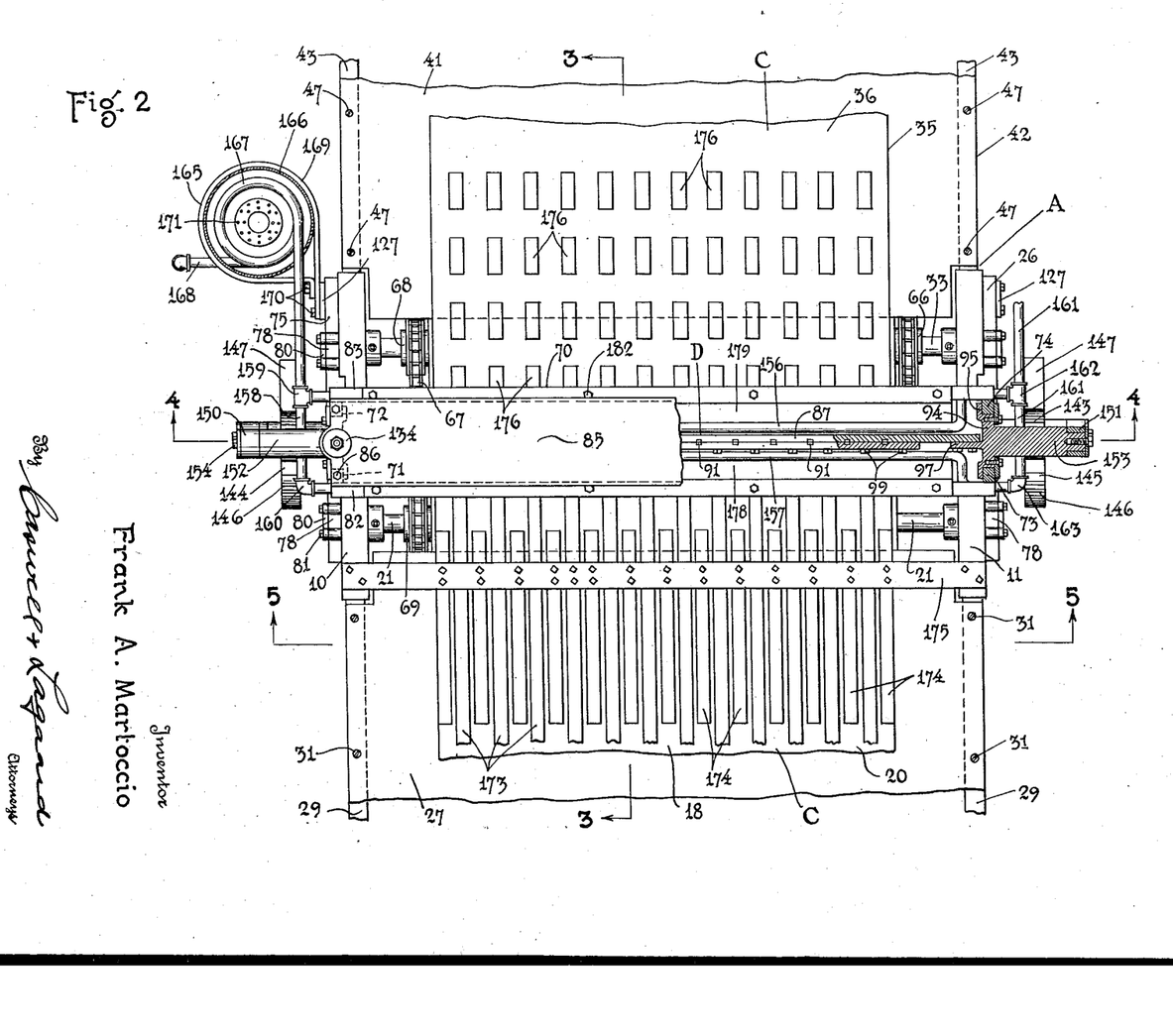
Fig. 2 is a plan view of the structure shown in Fig. 1 with portions of the same broken away to illustrate the construction thereof.
Figure 4:
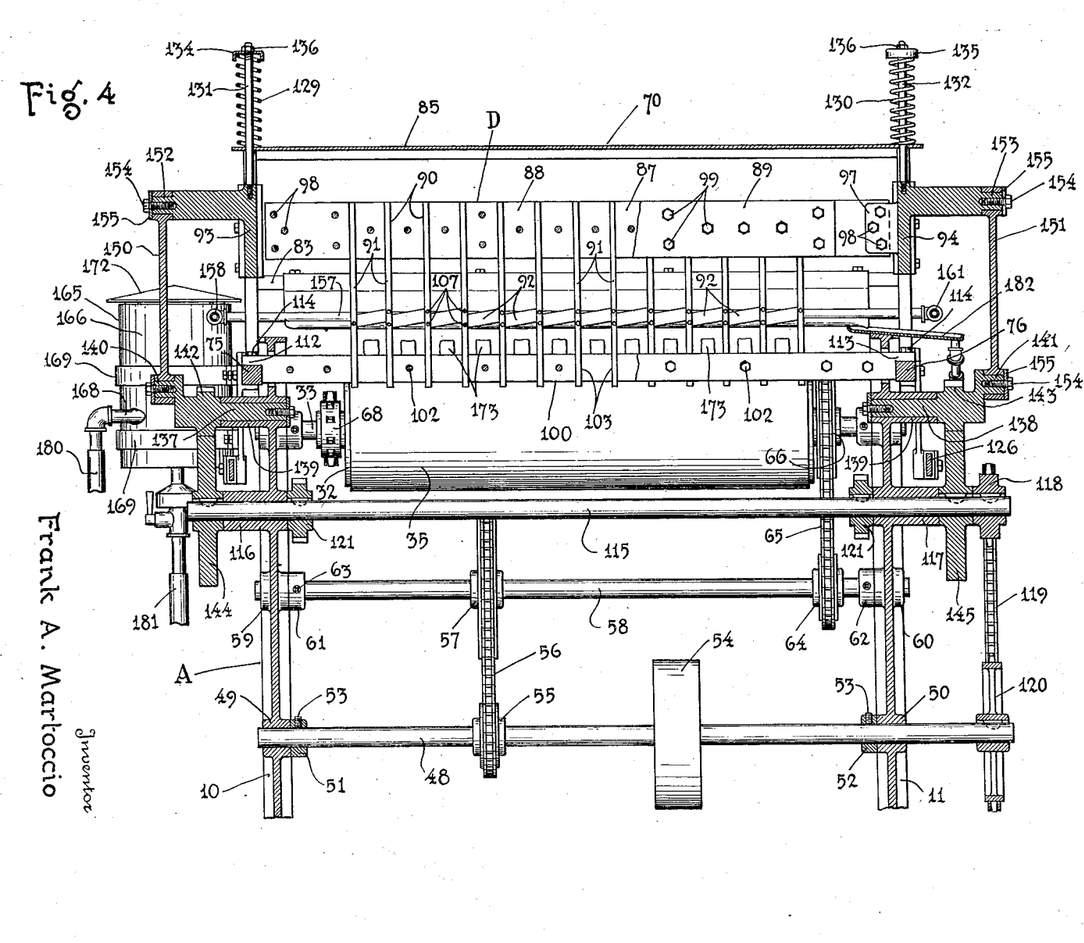
Fig. 4 is a transverse sectional view taken on line 4—4 of Fig. 2.
Figure 5:
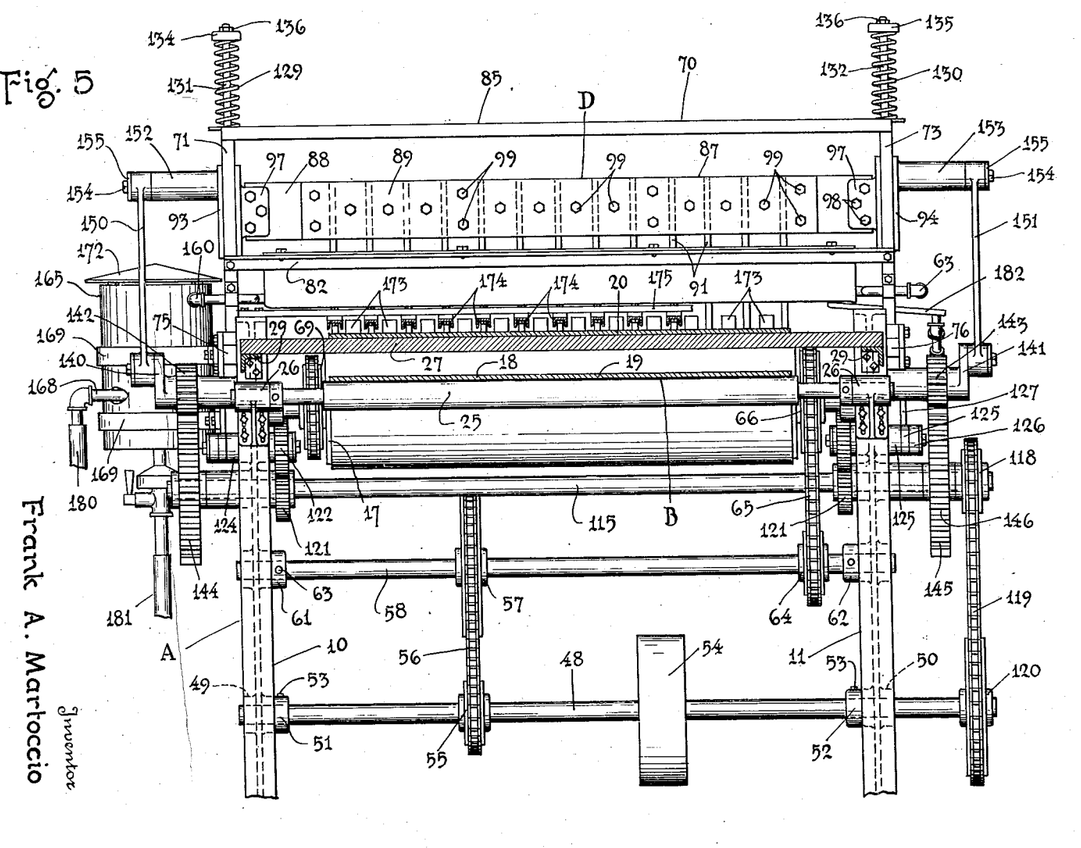
Fig. 5 is a transverse sectional view taken on line 5—5 of Fig. 2.

For the purpose of supporting the cutter D a carriage 70 is employed which is best shown in Figs. 1, 2 and 4. This carriage comprises four posts 71, 72, 73 and 74 which are spaced relative to one another and which are attached to two slides 75 and 76. Said posts are secured to the slides through screws 77 which pass through the said slides and are threaded into the ends of the posts. The slides 75 and 76 are mounted for reciprocating movement in bearings 78 which are secured to the end members 10 and 11 of frame A upon the exterior thereof through bolts 79.

Said bearings are constructed with removable caps 80 held in place through bolts 81 by means of which the slides may be readily disengaged from the machine when the occasion requires. The posts 71 and 73 are tied together through a longitudinal tie rod 82 which may be constructed from angle material. Posts 72 and 74 are similarly tied together through a tie rod 83 which is also constructed of angle material. These tie rods are bolted to said posts through bolts 84. The upper ends of the four posts 71, 72, 73 and 74 have attached to them a header 85 which is bolted to said posts through cap screws 86 threaded in said posts. The header 85 is preferably in the form of a channel and extends completely across the machine serving in addition to the tie rods 82 and 83 to secure the said posts together and to form the unitary structure for supporting the moving parts carried by the carriage. It will be readily comprehended that through the agency of the guide bearings 78 and the slides 75 and 76 that the entire carriage may be slided longitudinally with respect to the machine and in the same direction as the direction of travel of the conveyors B and C.

The cutter D is mounted for vertical reciprocation with respect to the carriage 70. This cutter comprises a cutter head 87 which consists of two transversely extending bars 88 and 89. These bars are constructed with complemental grooves 90 which when the bars are placed together form sockets for the reception of stems 91 which support the cutting blades 92. The two bars 88 and 89 are bolted together at frequent intervals through bolts 99 by means of which the stems 91 are rigidly clamped in position. The head 87 has secured to it at its ends end blocks 93 and 94. These end blocks are constructed with grooves 95 along the vertical edges thereof, which grooves receive the posts 71, 72, 73 and 74 of the carriage 70 and which slidably support the head 87 for vertical reciprocating movement. The end blocks 93 and 94 are constructed with flanges 97 by means of which the said end blocks are attached to the head 87. Bolts 98 pass through the said flanges and the head 87 and hold the parts rigidly secured to one another.

Figures 6, 7:
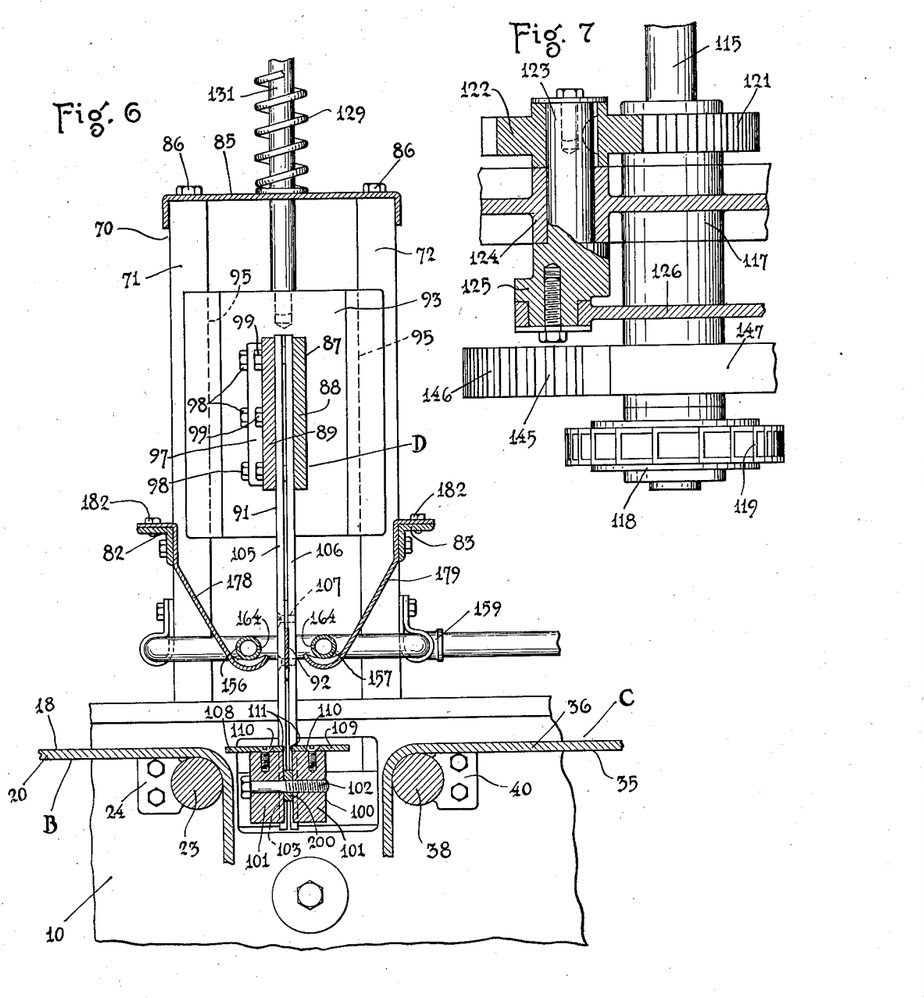
Fig. 6 is a longitudinal sectional view similar to Fig. 3 showing a portion of the structure illustrated therein and drawn to a larger scale.
Fig. 7 is a fragmentary plan sectional view taken on line 7—7 of Fig. 1 and drawn to a larger scale.

The carriage 70 is constructed with a bed 100 which consists of two bars 101 arranged adjacent one another as best shown in Fig. 6. These bars are secured together through a number of cap screws 102 and spaced slightly apart through spacer washers 200 to permit the knives 92 to enter between them. The bars 101 are formed with complemental slots 103 similar to the slots 90 in the head 87. These slots form guideways in which the stems 91 may reciprocate when the entire cutter is raised and lowered. The ends 112 and 113 of the bars 101 are notched and rest upon the two slides 75 and 76 of the carriage 70. These ends are bolted to the said slides through bolts 114 which are threaded in said slides.

The cutter proper consists of a number of cutting blades 92 which are attached to the stems 91. For this purpose said stems are constructed in two parts 105 and 106 and said blades disposed between the same. The two parts 105 and 106 are bolted together through counter-sunk screws 107 which pass through the parts 105 and the blades 92 and are threaded into the parts 106. By means of this construction the blades 92 may be readily removed from the cutter when the same wear or break and new blades substituted. The blades 92 are arranged on an incline as shown in Fig. 4 and cooperate with two shear plates 108 and 109 attached to the bars 101 of the bed 100. These plates are secured thereto through counter-sunk screws 110 which are threaded into the said bars. The plates 108 and 109 are formed with notches which receive the stems 91 and with edges 111 which cooperate with the blades 92 to cut the strips of candy into sections as the same pass over the bed 100.

The carriage 70 is reciprocated along the framework of the machine through the following construction: A shaft 115 is used for this purpose. This shaft is journaled in bearings 116 and 117 formed in the two end frame members 10 and 11 of framework A. This shaft has mounted upon the extreme end thereof a sprocket pinion 118 which is keyed thereto. A sprocket chain 119 passes over the sprocket pinion 118 and a sprocket wheel 120 secured to the end of the shaft 48 previously referred to. On the shaft 115 are secured two spur gear pinions 121 which are disposed adjacent the facing ends of the bearings 116 and 117. These gears hold the shaft 115 from longitudinal movement. Gears 121 mesh with spur pinions 122 secured to short shafts 123 situated in the two end frame members 10 and 11 and best shown in Fig. 7. Shafts 123 are journaled in bearings 124 formed in the end frame members 10 and 11. The shafts 123 have secured to them cranks 125 which have pivoted to them connecting rods 126. The connecting rods 126 are in turn pivoted through pins 177 to the ends of brackets 127 which are secured to the guides 75 and 76 and extend downwardly therefrom. As the shafts 123 are rotated the cranks cause the carriage 70 to be reciprocated in a longitudinal direction and along the path of movement of the two conveyors B and C. The brackets 127 prevent binding in the bearings 78 whereby a minimum amount of energy is required in the reciprocation of the carriage proper.

For the purpose of counterbalancing the weight of the head 87 and the cutter parts carried thereby, two coil springs 129 and 130 are employed. These coil springs encircle two rods 131 and 132 secured to the end blocks 93 and 94 and are seated against the header 85. The rods 131 and 132 slide through the header 85 and are threaded at their outer ends. Mounted upon the ends of the rods 131 and 132 are cup washers 134 and 135 which are adjustably held in place upon the ends of said rods through nuts 136 threaded upon the threaded portions of said rods. Springs 129 and 130 are seated at their other ends against these washers. By means of this construction a portion of the weight of the cutter D is counterbalanced so that the force required in reciprocating the cutter is greatly reduced.

The cutter D is reciprocated by means of the following construction: For this purpose two short shafts 137 and 138 are employed which are journaled in bearings 139 formed in the end frame members 10 and 11. These shafts have formed on the outer ends thereof cranks 140 and 141. The said shafts have further formed on them pinions 142 and 143 of a set of Geneva gears, of which the gears proper are designated by the reference numerals 144 and 145. These gears are mounted upon the ends of the shaft 115 and are rigidly secured thereto. The gears 144 and 145 are constructed with teeth 146 which extend throughout a portion of the periphery thereof and are further constructed with blank surfaces 147 throughout the remaining circumferential extent of the said gears. Pinions 142 and 143 are likewise constructed with gear teeth 148 which are adapted to mesh with the gear teeth 146 of the gears 144 and 145. These pinions are further constructed with arcuate surfaces 149 which are adapted to register with the blank surfaces 147 of said gears whereby the pinions 142 and 143 are held from movement during a portion of the rotation of the shaft 115. It will readily be comprehended that when the teeth 146 of the gears 144 and 145 engage the teeth 148 that the two shafts 137 and 138 are rotated and that rotation ceases when the arcuate portions 149 of pinions 142 and 143 engage the blank portions 147 of gears 144 and 145.

The two cranks 140 and 141 have attached to them connecting rods 150 and 151 which in turn are pivoted to stub shafts 152 and 153 formed on the end blocks 93 and 94. The connecting rods 150 and 151 may be retained in position upon the cranks 140 and 141 and the stub shafts 152 and 153 by means of screws 154 threaded into the said parts and through washers 155 mounted on said screws. As the shaft 115 rotates the cutter D is vertically reciprocated, the reciprocation enduring through but a portion of the time required for the movement of the carriage 70 to and fro. In the construction of the device the crank shafts 137 and 138 are situated medially between the extreme positions of the stub shafts 152 and 153 so that the angularity of the connecting rods is always a minimum and so that a minimum amount of energy is required to reciprocate the cutter.

I have discovered that sticking of the candy to the cutter as the cutter passes through the same may be prevented by the application of heat and moisture to the cutting blades. For this purpose I provide two steam conduits 156 and 157 which are connected to a common header 158 through pipe fittings 159 and 160. These conduits are similarly connected at their other ends to a header 161 through pipe fittings 162 and 163. The conduits 156 and 157 are constructed with apertures 164, said apertures being arranged opposite the various blades 92. When live steam is introduced into these conduits through the header 158 the same flows out through the apertures 164 which serve as steam jets and is directed upon the blades 92. Any condensation which is collected in the conduits 156 and 157 is discharged through the header 161 to a suitable waste.

To prevent condensation or drip from the various steam jets from settling upon the candy as it passes through the machine, two troughs 178 and 179 are employed which are best shown in Figs. 3 and 6. These troughs are secured to the angle supports or tie bars 82 and 83 through bolts 182. The troughs 178 and 179 are spaced below the conduits 156 and 157 and are connected at one end to a drain 182 by means of which the condensation may be led from the said troughs through a flexible hose 183.

To produce live steam I employ a super-heater 165 best shown in Figs. 2 and 4. This heater comprises a case 166 in which is disposed a copper coil 167 connected to the pipe fitting 159 and provided with an inlet 168 adapted to be connected to a source of steam. The case 166 is attached to the slide 75 of the carriage 70 through bands 169 which extend about the said case and are bolted to said slide through bolts 170. The case 166 is open at the bottom and is provided with a gas burner 171 by means of which the coil 167 is heated. Above the case 166 is a cover 172 which is spaced from the upper edge of said case to permit the fumes from the gas burner to escape from the upper end of the super-heater. A flexible hose 181 connected to the burner permits of reciprocating the carriage 70. It will be readily comprehended that the steam passing through the coil 167 is heated by the gas flame from the burner 171 so that when said steam enters the conduits 156 and 157 the same is relatively dry. A flexible hose 180 is connected to the coil 167 and serves to direct the steam into the super-heater.

The operation of my invention is as follows: The strips of candy indicated at 173 in Fig. 2 are placed upon the upper run 20 of the belt 18. The said strips of candy are guided along said belt by means of guide bars 174 which are attached to a transverse supporting bar 175 secured to the two end frame members 10 and 11. The strips of candy 173 are fed by the conveyor B to the cutter D by means of which the same are cut in sections 176. As the machine operates, the cutting blades 92 are lowered through the action of the gears 140 and 141 and the connecting rods 150 and 151 and cut off the sections 176. The blades being arranged on an incline cut through the candy more uniformly and sever the sections from the strip without distorting the shape of the severed section. As the cutting occurs the carriage 70 is also moved along with the run 20 of conveyor B so that the severing of the section of candy from the strip may be accomplished without distortion of either the candy bar or the remaining portion of the strip. It will be noted that the strip of candy spans the gap between the conveyor B and the bed 100 of carriage 70. As the said bed moves from conveyor B to conveyor C the section of candy is being severed from the strip and the same fed into the conveyor C. The movement of the bed 100 causes the candy to be positively delivered to the conveyor C where the same continues in its course. It will be noted that the speed of the various shafts is such that the cutter D travels downwardly and upwardly before the carriage 70 has moved from conveyor B to conveyor C so that when the said carriage is in its extreme position adjacent conveyor C the cutting blades 92 are in a position above the candy bars and the carriage is free to be moved back to its original position. As the carriage travels rearwardly steam from the various steam jets is directed upon the blades which heats the same and slightly moistens said blades so that when the next cutting operation is to be performed, sticking of the candy to the blades is entirely prevented. As previously stated, conveyor C travels at a greater rate of speed than conveyor B. This causes the severed sections of candy to be spaced upon the said conveyor which permits of running the sections of candy through an enrobing machine.

My invention is highly advantageous in that an extremely simple and practical device is provided whereby strips of candy may be cut into sections to form candy bars with maximum efficiency. By means of the dry steam applied to the cutting blades the cutting is effectively and positively performed. Candy is prevented from sticking to the blades which permits of cutting the candy bars in a rectangular shape with square corners. By means of the two speeds for the conveyors the candy bars are spaced upon the second conveyor so that the same may be directly run through an enrobing machine. Through the use of springs the weight of the cutter is partly counterbalanced so that but little effort is required in operating the same. The two cranks employed and their particular location and relation permit of driving the cutter and moving the carriage from the transmission mechanism carried by the framework instead of the carriage. By arranging the blades on a slight slant more efficient cutting of the candy is procured. The blades employed are relatively thin and being mounted between the various stems depending from the header may be readily removed when desired for the purpose of sharpening or replacement.

Changes in the specific form of my invention, as herein disclosed, may be made within the scope of what is claimed without departing from the spirit of my invention.

Having described my invention, what I claim as new and desire to protect by Letters Patent is:

1. In a candy cutting machine, means for progressing a strip of candy, a carriage movable in the same direction as said strip, a cutter carried by said carriage and including a blade movable to cut off sections of the strip during movement of the carriage, a steam jet carried by the carriage and movable therewith, said steam jet being directed toward said blade, and a steam superheater for heating the steam to said jet, said heater being carried by said carriage and movable therewith.

2. In a candy cutting machine, means for simultaneously progressing a plurality of strips of candy, a bed over which the candy strips travel, a head reciprocable toward and from said bed, a plurality of stems secured to said head and depending therefrom, guideways formed in said bed for guiding said stems for reciprocable movement relative thereto, cutting blades, one for each strip of candy, each blade being secured at its opposite ends to adjacent stems, and means for directing the progressing strips of candy toward their respective blades and between the stems to which said blades are secured.

3. In a candy cutting machine, aligned feed and delivery conveyors spaced apart at their adjacent ends, a cutter interposed between said conveyors, the feed conveyor being adapted to progress strips of candy endwise to the cutter, said cutter being adapted to sever sections from said strips and transfer the same to said delivery conveyor, said cutter comprising a reciprocating carriage movable forth and back between the conveyors, a bed on the carriage upon which the leading ends of the candy strips are fed, a reciprocating cutter head on said carriage movable toward and from said bed, stems issuing from said head and slidably guided in said bed, and co-planar cutting blades, one for each candy strip, each blade being secured at its opposite ends to adjacent stems, said blades being inclined to present inclined cutting edges to the strips to be cut and to provide for the staggering of adjacent ends of adjacent blades and the attachment thereof to a single stem.

4. In a candy cutting machine, aligned feed and delivery conveyors spaced apart at their adjacent ends, a cutter interposed between said conveyors, the feed conveyor being adapted to progress strips of candy endwise to the cutter, said cutter being adapted to sever sections from said strips and transfer the same to said delivery conveyor, said cutter comprising a reciprocating carriage movable forth and back between the conveyors, a bed on the carriage upon which the leading ends of the candy strips are fed, a reciprocating cutter head on said carriage movable toward and from said bed, stems issuing from said head and slidably guided in said bed, cutting blades, one for each candy strip, each blade being secured at its opposite ends to adjacent stems, and guides cooperating with the candy strips on said feed conveyor for directing the leading ends of said strips between said stems of said cutter.

5. In a candy cutting machine, aligned feed and delivery conveyors spaced apart at their adjacent ends, a cutter interposed between said conveyors, the feed conveyor being adapted to progress strips of candy endwise to the cutter, said cutter being adapted to sever sections from said strips and transfer the same to said delivery conveyor, said cutter comprising a reciprocating carriage movable forth and back between the conveyors, a bed on the carriage upon which the leading ends of the candy strips are fed, a reciprocating cutter head on said carriage movable toward and from said bed, stems issuing from said head and slidably guided in said bed, and cutting blades, one for each candy strip, each blade being secured at its opposite ends to adjacent stems.

6. In a candy cutting machine, a support over which a strip of candy to be cut into sections is progressed, a reciprocating carriage movable forward in the direction of movement of the strip and back again, a cutter carried by the carriage and including a blade movable to cut off a section of the advancing strip during the advancement of the carriage, means on the carriage for bringing steam into contact with said blade, and means on said carriage for heating the steam.

7. In a candy cutting machine, a support over which a strip of candy to be cut into sections is progressed, a reciprocating carriage movable forward in the direction of movement of the strip and back again, a cutter carried by the carriage and including a reciprocating blade movable forth and back intermittently from an inoperative position, means on the carriage for directing steam against the blade in the inoperative position thereof, and means also on said carriage for heating the steam.

FRANK A. MARTOCCIO.